United States Patent
Zhao et al.

(10) Patent No.: US 11,408,099 B2
(45) Date of Patent: Aug. 9, 2022

(54) METHOD AND DEVICE FOR GENERATING JACQUARD PATTERN OF PREFORM, ELECTRONIC DEVICE AND STORAGE MEDIUM

(71) Applicant: Nanjing Fiberglass Research & Design Institute Co., Ltd., Nanjing (CN)

(72) Inventors: Qian Zhao, Nanjing (CN); Fangfang Sun, Nanjing (CN); Haili Zhou, Nanjing (CN); Chao Li, Nanjing (CN); Liquan Zhang, Nanjing (CN); Hongwei Guo, Nanjing (CN)

(73) Assignee: Nanjing Fiberglass Research & Design Institute Co., Ltd., Nanjing (CN)

( * ) Notice: Subject to any disclaimer, the term of this patent is extended or adjusted under 35 U.S.C. 154(b) by 32 days.

(21) Appl. No.: 17/276,483

(22) PCT Filed: Mar. 25, 2020

(86) PCT No.: PCT/CN2020/081201
§ 371 (c)(1),
(2) Date: Mar. 16, 2021

(87) PCT Pub. No.: WO2021/134936
PCT Pub. Date: Jul. 8, 2021

(65) Prior Publication Data
US 2022/0106715 A1    Apr. 7, 2022

(30) Foreign Application Priority Data
Dec. 31, 2019  (CN) .......................... 201911402831.0

(51) Int. Cl.
*D03C 19/00*     (2006.01)
*D03D 25/00*     (2006.01)
(Continued)

(52) U.S. Cl.
CPC ......... *D03C 19/005* (2013.01); *D03D 13/004* (2013.01); *D03D 25/005* (2013.01); *G06F 30/10* (2020.01); *G06F 2113/12* (2020.01)

(58) Field of Classification Search
CPC .. D03C 19/005; D03D 13/004; D03D 25/005; D03D 41/004; G06F 30/10; G06F 2113/12
See application file for complete search history.

(56) References Cited

U.S. PATENT DOCUMENTS

| | | | |
|---|---|---|---|
| 11,243,473 B2* | 2/2022 | Wang | ...................... G03F 7/705 |
| 2003/0139840 A1* | 7/2003 | Magee | ............... D06B 11/0059 |
| | | | 700/133 |

(Continued)

FOREIGN PATENT DOCUMENTS

| | | |
|---|---|---|
| CN | 101503838 A | 8/2009 |
| CN | 102517759 A | 6/2012 |

(Continued)

OTHER PUBLICATIONS

Search Report, EP20859669.2, dated Aug. 10, 2021.
(Continued)

*Primary Examiner* — Robert H Muromoto, Jr.
(74) *Attorney, Agent, or Firm* — David R. Stevens; Stevens Law Group

(57) ABSTRACT

A method and a device are used for generating a jacquard pattern of a preform. The method comprises acquiring initial structure information of a preform to be prepared; generating an initial jacquard pattern of the preform to be prepared; pixel values of pixels in the initial jacquard pattern, comprising a first pixel value and a second pixel value, are equal to the first pixel value when warp yarns corresponding to the pixels are located above corresponding weft yarns, and are equal to the second pixel value when warp yarns corresponding to the pixels are located below corresponding weft (Continued)

yarns; acquiring yarn reduction information of the preform to be prepared; and adjusting the initial jacquard pattern according to the yarn reduction information to obtain the jacquard pattern of the preform to be prepared.

5 Claims, 8 Drawing Sheets

(51) Int. Cl.
*G06F 30/10* (2020.01)
*D03D 13/00* (2006.01)
*G06F 113/12* (2020.01)

(56) References Cited

U.S. PATENT DOCUMENTS

| | | | |
|---|---|---|---|
| 2006/0180041 A1* | 8/2006 | Kadota | D03D 39/00 101/483 |
| 2011/0277869 A1 | 11/2011 | Coupe | |
| 2013/0190917 A1* | 7/2013 | Cross | D03D 49/12 139/11 |
| 2017/0370247 A1 | 12/2017 | Provost | |
| 2018/0155858 A1* | 6/2018 | Laourine | D03D 13/004 |
| 2021/0113899 A1* | 4/2021 | Caron Kardos | A63B 60/48 |
| 2021/0342495 A1* | 11/2021 | Mohammed | G06F 30/12 |
| 2022/0119992 A1* | 4/2022 | Zhao | D03C 19/005 |

FOREIGN PATENT DOCUMENTS

| | | |
|---|---|---|
| CN | 102523366 A | 6/2012 |
| CN | 103952837 A | 7/2014 |
| CN | 106777646 A | 5/2017 |
| CN | 108717727 A | 10/2018 |
| CN | 109972271 A | 7/2019 |
| FR | 3062659 B1 | 3/2019 |
| HK | 1201671 A2 | 9/2015 |

OTHER PUBLICATIONS

Chinese Office Action, Application No. 2019114028310, dated Jun. 16, 2021.
Axial impact compressive behaviors of a novel 3-D integrated multilayer fabric reinforced composite.
Fabric weave and computer aided design of the looming draft thereof.
Geometric modeling of 3D 4-direction braided composites based on preform boundary.
Reducing fiber technic for 3D braiding hollow cone-shaped fabric.
Research on multilayer fabric structure and its CAD software development.
Research on the application of braided preform internal quality detection based on industrial CT scan.
Research summary in adding yarn and reducing yarn technology and mechanical properties of 3D braided preform with variable cros.
Search Report and Written Opinion, PCT/CN2020/081205, dated Sep. 29, 2020.
Research on Yarn-reduction Techniques and Bending Properties of Tapered Three-dimensional Braided Composites, Dec. 2011.
Study and Development of Multi-layer Fabric Structure and CAD Software, May 2006.
Computer-aided Design for Woven Fabric Structure and Appearance, Nov. 2014.

\* cited by examiner

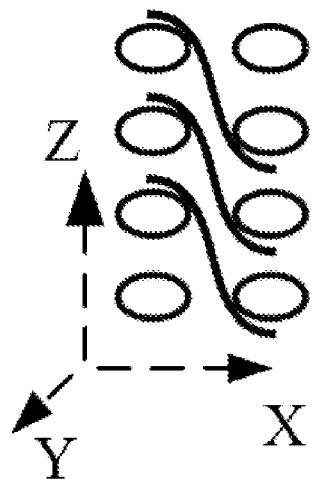 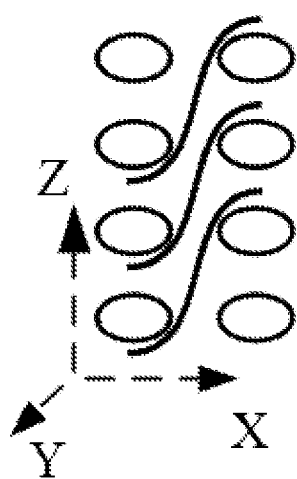
Fig. 4A  Fig. 4B
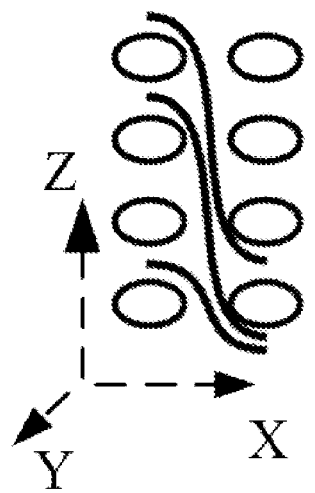 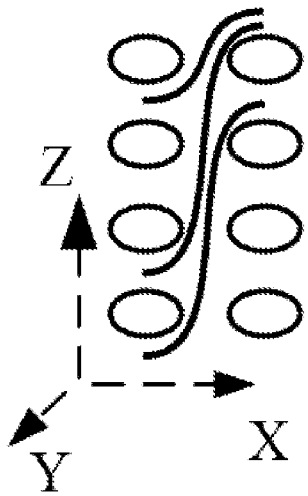
Fig. 5A  Fig. 5B

METHOD AND DEVICE FOR GENERATING JACQUARD PATTERN OF PREFORM, ELECTRONIC DEVICE AND STORAGE MEDIUM

TECHNICAL FIELD

The present application relates to the technical field of manufacturing technology, in particular to a method and a device for generating a jacquard pattern of a preform, an electronic device and storage medium.

BACKGROUND

Three-dimensional woven structural composites have attracted more and more attention because of their high specific strength, low density and good formability, and have been successfully applied in aircraft and automobile engineering. At present, for large preforms with complex structures and shapes, and a variable thickness, net shape forming manufacturing is usually realized by increasing or reducing yarns based on an electronic jacquard system. However, due to the large number of yarn reduction points in the variable-thickness preforms with complex structures and shapes, the yarn reduction position and number of yarn reduction layers are not regular. For example, the number of yarn reduction points in an aero-engine fan blade is as many as thousands of points. Therefore, if a jacquard pattern is generated directly according to the structure of the preform, it is necessary to take every interweaving point of warp columns and weft columns in the preform as an object. The number of warp yarn layers, number of weft yarn layers and the positional relationship between warp yarns and weft yarns at each interweaving point are acquired one by one, the jacquard pattern at each interweaving point is generated, so as to generate the jacquard pattern of the whole preform, resulting in low generation efficiency. And because the weave structure at each interweaving point will change to some extent after yarn reduction, it is difficult to acquire the weave structure at each interweaving point, and it is highly possible to cause errors during the generation process, making it difficult to generate the jacquard pattern of the preform and the accuracy is very low.

SUMMARY

In view of this, embodiments of the present application provide a method and a device for generating a jacquard pattern of a preform, an electronic device and storage medium, so as to solve the problems that the existing method for generating a jacquard pattern of a preform with increased or decreased yarns is low in generating efficiency, difficult to generate and low in accuracy of the finally generated jacquard pattern.

According to a first aspect, an embodiment of the present application provides a method for generating a jacquard pattern of a preform, which is characterized in comprising the following steps: acquiring initial structure information of a preform to be prepared, which comprises at least one initial primitive structure; wherein, the initial structure information comprises a warp yarn column number and a weft yarn column number of the preform to be prepared, and a warp yarn column number, a warp yarn layer number, a weft yarn column number and a weft yarn layer number, as well as a positional relationship between the warp yarns and the weft yarns of an initial primitive structure of the preform to be prepared; generating an initial jacquard pattern of the preform to be prepared according to the initial structure information; wherein, pixel values of pixels in the initial jacquard pattern, comprising a first pixel value and a second pixel value, are equal to the first pixel value when warp yarns corresponding to the pixels are located above corresponding weft yarns, and are equal to the second pixel value when warp yarns corresponding to the pixels are located below corresponding weft yarns; acquiring yarn reduction information of the preform to be prepared; wherein, the yarn reduction information comprises an actual warp yarn layer number and yarn reduction position information at interweaving points of each column of warp yarns and each column of weft yarns in the preform to be prepared; and adjusting the initial jacquard pattern according to the yarn reduction information to obtain the jacquard pattern of the preform to be prepared.

According to the method of the present application, firstly, an initial jacquard pattern of a preform to be prepared is generated according to the structural information of the preform to be prepared, especially the structural information of an initial primitive structure (the primitive structure without yarn reduction) in the preform to be prepared, then the initial jacquard pattern is adjusted based on the yarn reduction information, according to the acquired yarn reduction information such as actual warp layer number and yarn reduction positions at interweaving points of each column of warp yarns and each column of weft yarns of the preform to be prepared. The method can realize the integral automatic generation of the jacquard pattern of the preform to be prepared with complex structure which needs yarn reduction, without separately acquiring the weave structure at each interweaving point of the preform to be prepared and sequentially generating the jacquard pattern at each interweaving point, then forming the jacquard pattern of the whole preform to be prepared by combination, and the generation efficiency of the jacquard pattern is high, but since the weave structure after yarn reduction at each interweaving point will change to some extent, it is difficult to obtain the weave structure at each interweaving point, and the possibility of error is also high. Therefore, it is less difficult to implement the method for generating the jacquard pattern of the preform without obtaining the weave structure at each interweaving point, and the generated jacquard pattern has high accuracy.

In combination with that first aspect, in a first implementation of the first aspect, the preform to be prepare comprises at least two initial primitive structures; and the initial structure information also comprises a type of the primitive structure at the interweaving points of each column of warp yarns and each column of weft yarns of the preform to be prepared.

Combined with the first aspect or the first implementation of the first aspect, in a second implementation of the first aspect, the step of adjusting the initial jacquard pattern according to the yarn reduction information to obtain the jacquard pattern of the preform to be prepared comprises acquiring the actual warp yarn layer number at interweaving points to be reduced of a warp yarn column to be reduced and a weft yarn column to be reduced in the preform to be prepared; determining an actual weft yarn layer number at the interweaving points according to the actual warp yarn layer number and the positional relationship between the warp yarns and weft yarns in the initial structure information; and adjusting the initial jacquard pattern according to the actual warp yarn layer number, the actual weft yarn layer number and the yarn reduction position information to obtain the jacquard pattern of the preform to be prepared.

Combined with the first aspect or the first implementation of the first aspect or the second implementation of the first aspect, in a third implementation of the first aspect, the yarn reduction position information comprises information about warp yarn reduction starting position and information about weft yarn reduction starting position, wherein the warp yarn reduction starting position is any layer of warp yarns except the first layer of warp yarns and the last layer of warp yarns, and the weft yarn reduction starting position is the first layer of weft yarns or the last layer of weft yarns.

Combining with the third implementation of the first aspect, in a fourth implementation of the first aspect, the step of adjusting the initial jacquard pattern according to the actual warp yarn layer number, the actual weft yarn layer number and the yarn reduction position information to obtain the jacquard pattern of the preform to be prepared comprises: determining a weft yarn layer to be reduced at the interweaving point to be reduced according to the actual weft yarn layer number, the weft yarn layer number of the initial primitive structure and the weft yarn reduction starting position information; acquiring first rows to be reduced corresponding to the weft yarn layers to be reduced and first columns to be reduced corresponding to each layer of warp yarns in the warp yarn columns to be reduced in the initial jacquard pattern, and setting pixel values of pixels of each first column to be reduced in the first rows to be reduced as either the first pixel value or the second pixel value; determining the warp yarn layer to be reduced at the interweaving point to be reduced according to the actual warp yarn layer number, the warp yarn layer number of the initial primitive structure and the warp yarn reduction starting position information; and acquiring second columns to be reduced corresponding to the warp yarn layers to be reduced and second rows to be reduced corresponding to each layer of weft yarns in the weft yarn columns to be reduced in the initial jacquard pattern, and setting pixel values of pixels of each second row to be reduced in the second columns to be reduced as the first pixel value or the second pixel value.

Combined with the fourth implementation of the first aspect, in a fifth implementation of the first aspect, the number of rows occupied by the weft yarn columns to be reduced in the jacquard pattern is the maximum value of the actual weft yarn layer number at the interweaving points of the weft yarn columns to be reduced and each warp yarn column to be reduced; and the step of adjusting the initial jacquard pattern according to the actual warp yarn layer number, the actual weft yarn layer number and the yarn reduction position information to obtain the jacquard pattern of the preform to be prepared further comprises setting the pixel values of pixels of the rows corresponding to the weft yarn columns to be reduced in the jacquard pattern and having a number greater than the actual weft yarn layer number of the weft yarn columns to be reduced as the first pixel value or the second pixel value.

According to a second aspect, an embodiment of the present application provides a device for generating a jacquard pattern of a preform, which comprises: a structure information acquisition module, for acquiring initial structure information of a preform to be prepared; wherein, the initial structure information comprises a warp yarn column number and a weft yarn column number of the preform to be prepared, and a warp yarn column number, a warp yarn layer number, a weft yarn column number and a weft yarn layer number, as well as a positional relationship between the warp yarns and the weft yarns of an initial primitive structure of the preform to be prepared; an initial jacquard pattern generating module, for generating an initial jacquard pattern of the preform to be prepared according to the initial structure information; wherein, pixel values of pixels in the initial jacquard pattern, comprising a first pixel value and a second pixel value, are equal to the first pixel value when warp yarns corresponding to the pixels are located above corresponding weft yarns, and are equal to the second pixel value when warp yarns corresponding to the pixels are located below corresponding weft yarns; a yarn reduction information acquisition module, for acquiring yarn reduction information of the preform to be prepared; wherein, the yarn reduction information comprises an actual warp yarn layer number and yarn reduction position information at interweaving points of each column of warp yarns and each column of weft yarns in the preform to be prepared; and a jacquard pattern generating module, for adjusting the initial jacquard pattern according to the yarn reduction information to obtain the jacquard pattern of the preform to be prepared.

According to a third aspect, an embodiment of the present application provides an electronic device, which comprises memory and a processor, which are in communication connection with each other, wherein the memory stores computer instructions therein, which are executed by the processor to perform the method for generating a jacquard pattern of a preform described in the first aspect or any one implementation of the first aspect.

According to a fourth aspect, an implementation of the present application provides a computer-readable storage medium storing computer instructions for causing a computer to execute the method for generating a jacquard pattern of a preform described in the first aspect or any one implementation of the first aspect.

BRIEF DESCRIPTION OF THE DRAWINGS

In order to make a clearer description of technical solutions in specific implementations of the present application or prior art, drawings involved in description for the specific implementations or the prior art will be briefly introduced, and apparently, the drawings described below illustrate some implementations of the present application, for one with ordinary skill in the art, other drawings can also be obtained in accordance with these drawings without delivering creative efforts.

FIGS. 4A-4B are schematic structural diagrams of another initial primitive structure;

FIGS. 5A-5B are schematic structural diagrams of another initial primitive structure;

DETAILED DESCRIPTION

In order to make the purpose, technical solutions and advantages in embodiments of the present application clearer, the technical solutions in the embodiments of the present application will be described as follows clearly and completely referring to figures accompanying the embodiments of the present application, and surely, the described embodiments are just part rather than all embodiments of the present application. Based on the embodiments of the present application, all the other embodiments acquired by those skilled in the art without delivering creative efforts shall fall into the protection scope of the present application.

In the description of the present application, it should be noted that the terms "first", "second" and "third" are only used for descriptive purposes, and cannot be understood as indicating or implying relative importance.

Embodiment 1

Figure 1:
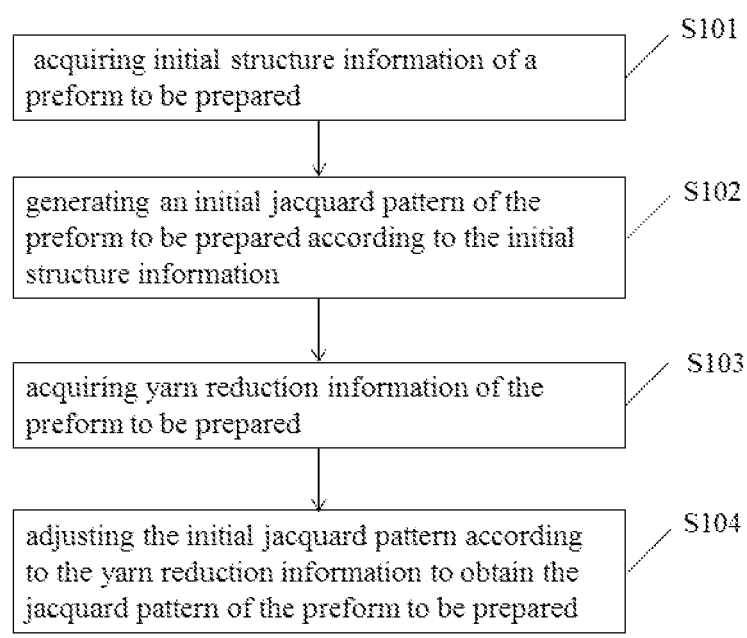
FIG. 1 is a flow chart of a method for generating a jacquard pattern of a preform provided by an embodiment of the present application.

FIG. 1 shows a flow chart of a method for generating a jacquard pattern of a preform according to an embodiment of the present application. As shown in FIG. 1, the method may include the following steps:

S101: acquiring initial structure information of a preform to be prepared.

In this embodiment, the preform to be prepared includes at least one initial primitive structure; wherein, the initial structure information comprises a warp yarn column number and a weft yarn column number of the preform to be prepared, and a warp yarn column number, a warp yarn layer number, a weft yarn column number and a weft yarn layer number, as well as a positional relationship between the warp yarns and the weft yarns of an initial primitive structure of the preform to be prepared.

Figure 2A:
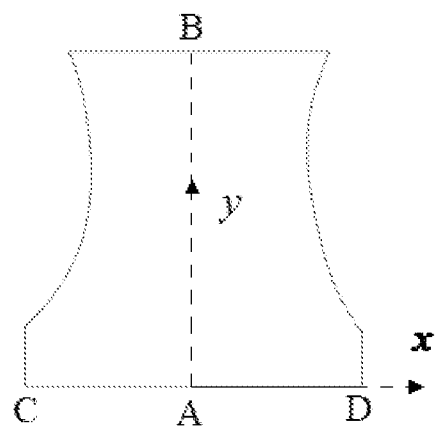
FIGS. 2A-2D are respectively a main view, a side view, a front view and a perspective view of a preform to be prepared.
Figure 2B:
Figure 2C:
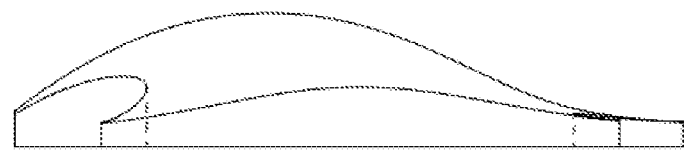
Figure 2D:
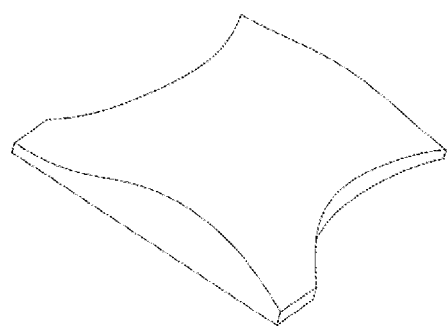

In the embodiment of the present application, if the preform to be prepared is a preform with an irregular shape as shown in FIGS. 2A-2D, the warp yarn column number of the preform to be prepared is the column number of the warp yarns at the longest part of the preform to be prepared (following the above example, the part where a line segment AB lies in FIG. 2A is the longest part of the preform to be prepared), and the weft yarn column number of the preform to be prepared is the widest part of the preform to be prepared (following the above example, the part where the line segment CD in FIG. 2A lies is the widest part of the preform to be prepared).

In the implementation of the present application, it should be noted that the initial primitive structure is the smallest unit used to express the positional relationship between warp yarns and weft yarns in the preform to be prepared. Meanwhile, the warp layer number and weft layer number in the initial primitive structure are the number at the thickest part of the preform to be prepared, so the warp layer numbers at the interweaving points of each warp column and each weft column in the preform to be prepared are each less than or equal to those in the initial primitive structure, and the weft layer numbers at the interweaving points of each warp column and each weft column in the preform to be prepared are each less than or equal to the weft layer number in the initial primitive structure. Therefore, the jacquard pattern generation method of the preform in the embodiment of the present application only involves yarn reduction but not yarn increase. However, it should be understood by those skilled in the art that the corresponding method of generating a jacquard pattern of the preform to be prepared by yarn increase can be obtained by reversely deducing the method in the embodiment of the present application.

In addition, it should be noted that although the initial primitive structure is the smallest unit used to indicate the positional relationship between warp yarns and weft yarns in the preform to be prepared, it is not required that all primitive structures included in the preform to be prepared are complete primitive structures. Specifically, taking the preform to be prepared in FIGS. 2A-2D as an example, the warp yarn column number of the preform to be prepared is 12, and the weft yarn column number of the preform to be prepared is 15. However, the initial primitive structure of the preform to be prepared may have 4 columns of warp yarns and 4 columns of weft yarns.

Figure 3A:
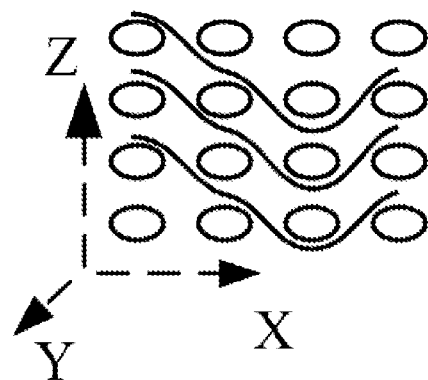
FIGS. 3A-3D are schematic structural diagrams of an initial primitive structure.
Figure 3B:
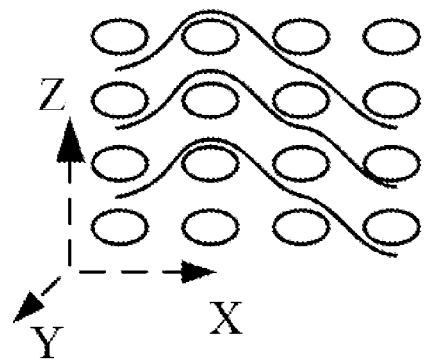
Figure 3C:
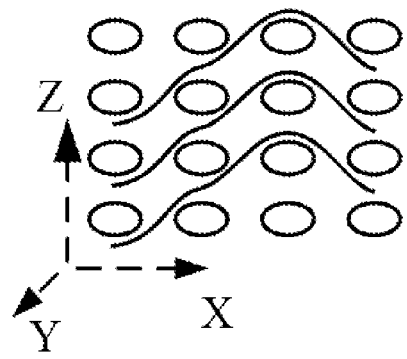
Figure 3D:
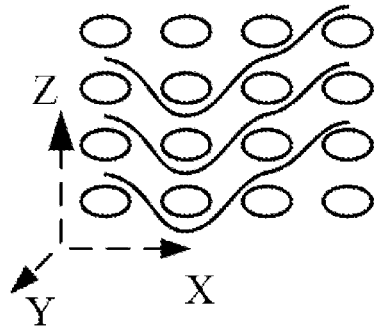

In the embodiment of the present application, the preform to be prepared may include only one initial primitive structure, or two or more initial primitive structures. Specifically, the preform to be prepared may include only one initial primitive structure (hereinafter referred to as initial primitive structure 1) as shown in FIGS. 3A-3D, where solid lines represent warp yarns and ellipses represent weft yarns, and the initial primitive structure 1 includes four columns of warp yarns and four columns of weft yarns, each column of warp yarns includes 3 layers, and each column of weft yarns includes 4 layers. Specifically, the direction of the X axis in FIGS. 3A-3D is the extending direction of weft yarn columns, and the direction of the Y axis is the extending direction of warp yarn columns, and the direction of the Z axis is the extending direction of warp yarn layers and weft yarn layers. FIG. 3A shows the structure of the initial primitive structure 1 with a plane as the cross section, in which a first column of warp yarns is located and FIG. 3B shows the structure of the initial primitive structure 1 with a plane as the cross section, in which a second column of warp yarns is located, FIG. 3C shows the structure of the initial primitive structure 1 with a plane as the cross section, in which a third column of warp yarns is located, and FIG. 3D shows the structure of the initial primitive structure 1 with a plane as the cross section, in which a fourth column of warp yarns is located.

Alternatively, the preform to be prepared may also include the initial primitive structure shown in FIGS. 4A-4B (hereinafter referred to as initial primitive structure 2) and the initial primitive structure shown in FIGS. 54A-5B (hereinafter referred to as initial primitive structure 3). The solid lines represent warp yarns, ellipses represent weft yarns, the direction of the X axis in FIGS. 4A-4B and 5A-5B is the extending direction of weft yarn columns, and the direction of the Y axis is the extending direction of warp yarn columns, and the direction of the Z axis is the extending direction of warp yarn layers and weft yarn layers. Specifically, the initial primitive structure 2 includes two columns of warp yarns and two columns of weft yarns, each column of warp yarns includes 3 layers, and each column of weft yarns includes 4 layers. FIG. 4A shows the structure of the initial primitive structure 2 with a plane as the cross section, in which a first column of warp yarns is located taken, and FIG. 4B shows the structure of the initial primitive structure 2 with a plane as the cross section, in which a second column of warp yarns is located taken. The initial primitive structure 3 includes two columns of warp yarns and two columns of weft yarns, each column of warp yarns includes 3 layers, and each column of weft yarns includes 4 layers. FIG. 5A shows the structure of the initial primitive structure 3 with a plane as the cross section, in which a first column of warp yarns is located taken, and FIG. 5B shows the structure of the initial primitive structure 3 with a plane as the cross section, in which a second column of warp yarns is located taken.

It should be noted that, since the above-mentioned initial primitive structures 1, 2, and 3 are all regular textured structures, they are all shown with a minimum number of layers that can represent the structures thereof, that is, the initial primitive structure each comprises 3 layers of warp yarns in each column of warp yarns and 4 layers of weft yarns in each column of weft yarns. However, those skilled in the art should be able to understand that the warp yarn layer number at the thickest part of the preform to be prepared is generally greater than 3 and the weft yarn layer number is generally greater than 4, which is based on the regularity of the structure of the above-mentioned initial primitive structures 1, 2 and 3. Therefore, when the initial primitive structure has a greater warp yarn layer number and a greater weft yarn layer number (for example, each warp yarn column includes 9 layers, and each column of weft yarns includes 10 layers), the specific structure of the initial primitive structure can be obtained by enlarging the structure shown in FIGS. 3A-3D, FIGS. 4A-4B and FIGS. 4A-5B, and will not be repeated herein.

S102: generating an initial jacquard pattern of the preform to be prepared according to the initial structure information.

In the embodiment of the present application, pixel values of pixels in the initial jacquard pattern, comprising a first pixel value and a second pixel value, are equal to the first pixel value when warp yarns corresponding to the pixels are located above corresponding weft yarns, and are equal to the second pixel value when warp yarns corresponding to the pixels are located below corresponding weft yarns.

In the embodiment of the present application, it should be noted that if the preform to be prepared includes various initial primitive structures, knot information of the preform to be prepared also comprises a type of the primitive structure at the interweaving points of each column of warp yarns and each column of weft yarns of the preform to be prepared. Specifically, following the above example, if the structure of the preform to be prepared is as shown in FIGS. 2A-2D, and the preform to be prepared includes initial primitive structures 1, 2 and 3, the warp yarn column number, the weft yarn column number, and the type of the primitive structure at the interweaving points of each column of warp yarns (12 columns in total, J1-J12) and each column of weft yarns (15 columns in total, W1-W15) of the preform to be prepared in the knot information of the preform to be prepared can be denoted as table 1:

TABLE 1

|  | J1 | J2 | J3 | J4 | J5 | J6 | J7 | J8 | J9 | J10 | J11 | J12 |
|---|---|---|---|---|---|---|---|---|---|---|---|---|
| W1 | 2 | 2 | 2 | 2 | 2 | 2 | 2 | 2 | 1 | 1 | 1 | 1 |
| W2 | 2 | 2 | 2 | 2 | 2 | 2 | 2 | 1 | 1 | 1 | 1 | 1 |
| W3 | 2 | 2 | 2 | 2 | 2 | 2 | 1 | 1 | 1 | 1 | 1 | 1 |
| W4 |  | 2 | 2 | 2 | 2 | 2 | 2 | 1 | 1 | 1 | 1 |  |
| W5 |  | 2 | 2 | 2 | 2 | 2 | 1 | 1 | 1 | 1 |  |  |
| W6 |  | 2 | 2 | 2 | 2 | 1 | 1 | 1 | 1 |  |  |  |
| W7 |  |  | 2 | 2 | 2 | 1 | 1 | 1 | 1 |  |  |  |
| W8 |  |  | 2 | 2 | 2 | 1 | 3 | 1 |  |  |  |  |
| W9 |  |  | 2 | 2 | 2 | 3 | 3 | 3 |  |  |  |  |
| W10 |  |  | 2 | 2 | 2 | 3 | 3 | 3 | 3 |  |  |  |
| W11 |  |  | 2 | 2 | 3 | 3 | 3 | 3 | 3 |  |  |  |
| W12 |  |  |  | 2 | 3 | 3 | 3 | 3 | 3 | 3 |  |  |

TABLE 1-continued

|  | J1 | J2 | J3 | J4 | J5 | J6 | J7 | J8 | J9 | J10 | J11 | J12 |
|---|---|---|---|---|---|---|---|---|---|---|---|---|
| W13 |  |  |  | 3 | 3 | 3 | 3 | 3 | 3 | 3 | 3 |  |
| W14 |  |  |  |  | 3 | 3 | 3 | 3 | 3 | 3 | 3 | 3 |
| W15 |  |  |  |  | 3 | 3 | 3 | 3 | 3 | 3 | 3 | 3 |

In the embodiment of the present application, the generation method of the initial jacquard pattern can be any existing method that can generate the corresponding jacquard pattern according to the structural information of the preform to be prepared, and there is no restriction herein.

S103: acquiring yarn reduction information of the preform to be prepared.

In the embodiment of the present application, the yarn reduction information comprises an actual warp yarn layer number and yarn reduction position information at interweaving points of each column of warp yarns and each column of weft yarns in the preform to be prepared.

Following the above example, if the structure of the preform to be prepared is as shown in FIGS. 2A-2D, and the preform to be prepared includes initial primitive structures 1, 2, and 3, the warp yarn column number (12 columns in total, J1-J12), the weft yarn column number (15 columns in total, W1-W15), and the type of the primitive structure at the interweaving points of each column of warp yarns and each column of weft yarns of the preform to be prepared in the knot information thereof are denoted as table 1, then the actual warp yarn layer number at interweaving points of each column of warp yarns and each column of weft yarns in the yarn reduction information can be shown in Table 2:

TABLE 2

|  | J1 | J2 | J3 | J4 | J5 | J6 | J7 | J8 | J9 | J10 | J11 | J12 |
|---|---|---|---|---|---|---|---|---|---|---|---|---|
| W1 | 2 | 3 | 3 | 5 | 6 | 8 | 9 | 9 | 8 | 7 | 5 | 3 |
| W2 | 2 | 3 | 3 | 5 | 6 | 8 | 8 | 9 | 8 | 7 | 5 | 3 |
| W3 | 2 | 3 | 3 | 5 | 6 | 7 | 8 | 8 | 8 | 7 | 5 | 3 |
| W4 |  | 3 | 3 | 5 | 6 | 7 | 8 | 8 | 7 | 6 | 5 |  |
| W5 |  | 3 | 3 | 5 | 6 | 7 | 8 | 7 | 7 | 6 |  |  |
| W6 |  | 3 | 3 | 4 | 6 | 7 | 7 | 7 | 7 | 6 |  |  |
| W7 |  |  | 3 | 4 | 6 | 6 | 7 | 7 | 6 | 5 |  |  |
| W8 |  |  | 3 | 4 | 5 | 6 | 7 | 6 | 6 |  |  |  |
| W9 |  |  | 3 | 4 | 5 | 6 | 6 | 6 | 5 |  |  |  |
| W10 |  |  | 3 | 4 | 5 | 6 | 6 | 6 | 5 |  |  |  |
| W11 |  |  | 3 | 4 | 5 | 6 | 6 | 5 | 5 |  |  |  |
| W12 |  |  | 3 | 4 | 5 | 5 | 5 | 5 | 4 |  |  |  |
| W13 |  |  | 3 | 4 | 5 | 5 | 5 | 5 | 4 | 3 |  |  |
| W14 |  |  | 3 | 4 | 4 | 5 | 5 | 4 | 4 | 3 |  |  |
| W15 |  |  | 3 | 4 | 4 | 5 | 4 | 4 | 3 | 3 |  |  |

In an embodiment of the present application, the weft yarn layer number in the initial primitive structure is related to the warp yarn layer number, both of which can be obtained according to the positional relationship between warp yarns and weft yarns in various initial primitive structures. Therefore, the actual weft yarn layer number at the interweaving points of each column of warp yarns and each column of weft yarns can be obtained according to the actual warp yarn layer umber at the corresponding interweaving points, specifically, in the above-mentioned initial primitive structure 1, 2 and 3, the actual number of weft yarn layers at the interweaving points of each column of warp yarns and each column of weft yarns is greater than the actual number of warp yarn layers at a corresponding interweaving point.

In an embodiment of the present application, the yarn reduction position information may include information about warp yarn reduction starting position and information about weft yarn reduction starting position.

In an embodiment of the present application, the warp yarn reduction starting position may be any layer of warp yarns in a column of warp yarns, and specifically, the warp yarn reduction starting position can be any layer of warp yarns except the first layer of warp yarns and the last layer of warp yarns, for example, the second layer or the penultimate layer of warp yarns. In this embodiment, there may be more than one warp yarn reduction starting position. For example, in order to realize symmetrical yarn reduction, both the second layer of warp yarns and the penultimate layer of warp yarns can be used as warp yarn reduction starting positions, and when the warp yarn reduction is carried out, half of the warp yarn layers to be reduced is reduced at each starting position of warp yarn reduction (if the number of warp yarn layers to be reduced is odd, one more layer of warp yarns is reduced at a warp yarn reduction starting position).

In an embodiment of the present application, the weft yarn reduction starting position can also be any layer of weft yarns in a column of weft yarns. Specifically, the weft yarn reduction starting position can be the first layer of weft yarns or the last layer of weft yarns. In this embodiment, in order to achieve symmetrical yarn reduction, both the first layer of weft yarns and the last layer of weft yarns can be used as the weft yarn reduction starting position. When weft yarn reduction is carried out, half of the weft layers to be reduced is reduced at each weft yarn reduction starting position (if the number of weft yarn layers to be reduced is odd, one more layer of weft yarns is reduced at a weft yarn reduction starting position).

In an embodiment of the present application, the yarn reduction position information also includes warp yarn reduction direction information and weft yarn reduction direction information. Specifically, the warp yarn reduction direction information can be determined according to the warp yarn reduction starting position information. For example, when the warp yarn reduction starting position is the second layer of warp yarns, the warp yarn reduction direction is toward the last layer of warp yarns, and when the warp yarn reduction starting position is the penultimate layer of warp yarns, the warp yarn reduction direction is toward the first layer of warp yarns. Specifically, the weft yarn reduction direction information can also be determined according to the weft yarn reduction starting position information. When the weft yarn reduction starting position is the first layer of weft yarns, the weft yarn reduction direction is toward the last layer of weft yarns, and when the weft yarn reduction starting position is the last layer of weft yarns, the weft yarn reduction direction is toward the first layer of weft yarns.

It should be noted that the first layer of warp yarns and the last layer of warp yarns respectively refer to two outermost layers of warp yarns in a column of warp yarns. When one outermost layer of warp yarns is the first layer of warp yarns, the other outermost layer of warp yarns is the last layer of warp yarns accordingly. Similarly, the first layer of weft yarns and the last layer of weft yarns respectively refer to two layers of weft yarns located at the outermost side in a column of weft yarns; the first layer and the last layer here should not constitute other restrictions on the embodiments of the present application.

S104: adjusting the initial jacquard pattern according to the yarn reduction information to obtain the jacquard pattern of the preform to be prepared.

In an embodiment of the present application, when a layer of warp yarns (assumed as warp yarn layer A) is reduced at a certain interweaving point (assumed as interweaving point A), the warp yarn layer A is raised above all weft yarns or below all weft yarns, that is, among all pixels corresponding to the interweaving point A in the initial jacquard pattern, the pixel values of a column of pixels corresponding to warp layer A are each set as the first pixel value or the second pixel value. Specifically, when the warp layer A is close to the first layer of warp yarns in the interweaving point A, the warp layer A can be lifted above all weft yarns, and accordingly, among all pixel in the jacquard pattern corresponding to the interweaving point A, the pixel values of a column of pixels corresponding to warp layer A are each set as the first pixel value. When the warp layer A is close to the last layer of warp yarns in the interweaving point A, the warp layer A can be lifted below all weft yarns, and accordingly, among all pixel in the initial jacquard pattern corresponding to the interweaving point A, the pixel values of a column of pixels corresponding to warp layer A are each set as the second pixel value.

Figure 6:
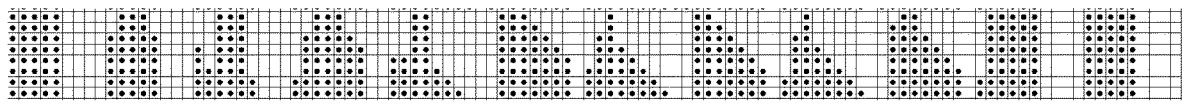
FIG. 6 is a jacquard pattern of the sixth column of weft yarns in the preform to be prepared in FIGS. 2A-2D.
Figure 7:
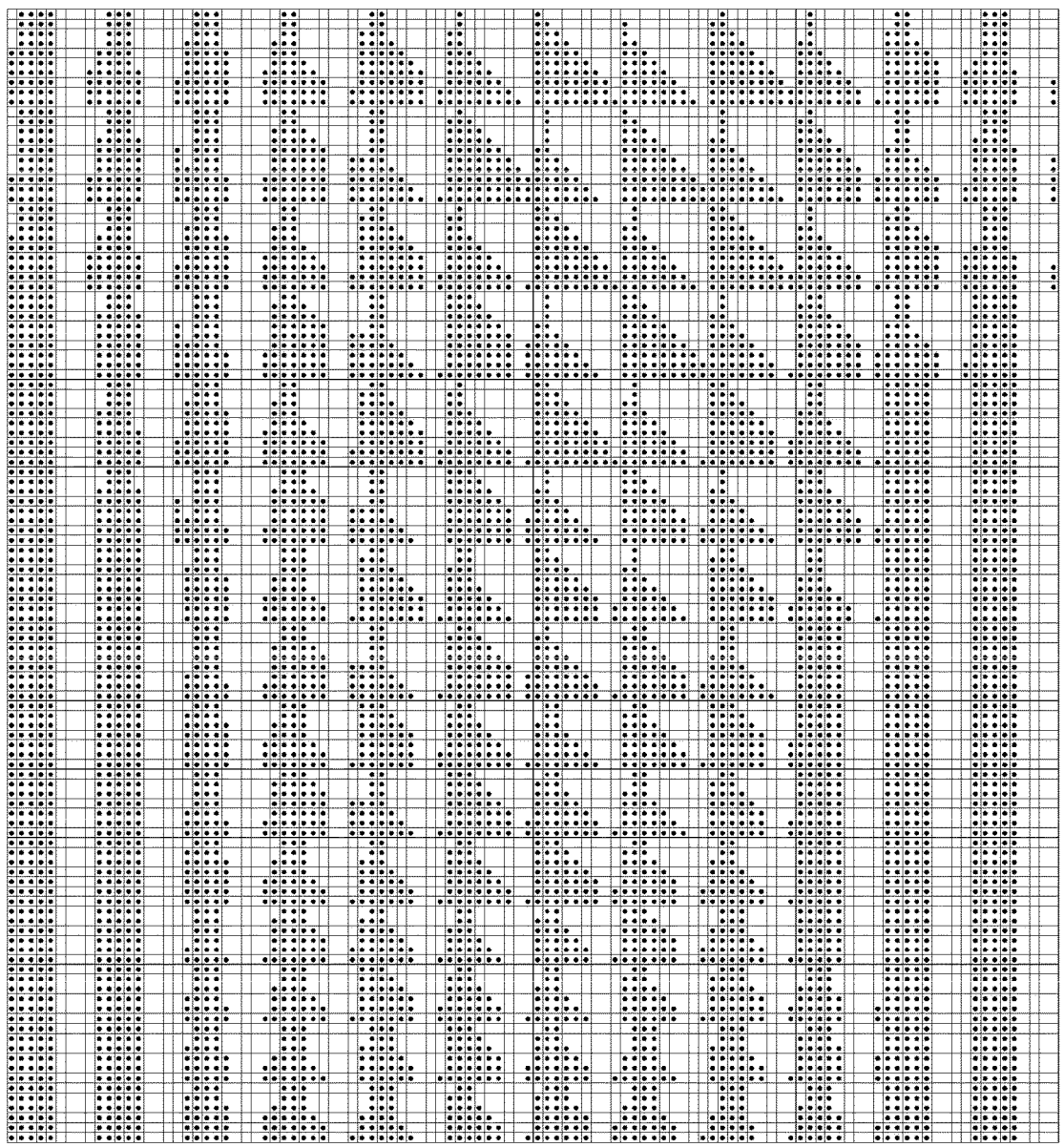
FIG. 7 is a jacquard pattern of the preform to be prepared in FIGS. 2A-2D.

In an embodiment of the present application, when a layer of weft yarns (assumed as weft yarn layer B) is reduced from a column of weft yarns (assumed as weft yarn column B) at a certain interweaving point (assumed as interweaving point B), a row of pixels corresponding to weft yarn layer B are set as the first pixels or second pixels, among all pixel in the initial jacquard pattern corresponding to the interweaving point B. At the same time, the weft layer B is reduced at the interweaving point of the weft column B and all warp columns, that is, the pixel values of all pixels in the rows of the initial jacquard pattern corresponding to the weft layer B are set as the first pixel or the second pixel, then the rows corresponding to the weft layer B in the initial jacquard pattern can be deleted. Following the above example, if the starting position of yarn reduction is the first layer of weft yarns, then according to Table 1, the warp layer number at the interweaving points of the sixth column of weft yarns (W6) and the first column to the twelfth column of warp yarns (J1-J12) are 0, 3, 3, 4, 6, 7, 7, 7, 6, 0, 0, respectively, accordingly, the weft yarn layer numbers at each interweaving point are 0, 4, 4, 5, 7, 8, 8, 8, 8, 7, 0, 0 respectively (there is one more layer of weft yarns than warp yarns, but those skilled in the art should be able to understand that, when the warp layer number is 0, the weft layer number is also 0), and the number of weft layers in the initial primitive structure is 10. Therefore, the first and second layers of warp yarns in the 6th column of weft yarns are reduced from at all interweaving points, that is, the pixel values of the rows corresponding to the first and second layers of warp yarns in the 6th column of weft yarns in the initial jacquard pattern are the first pixel values or the second pixel values, and the corresponding rows can be deleted. The adjusted jacquard pattern corresponding to the 6th column of weft yarns is shown in FIG. 6, where w3-w10 refers to the third layer to the tenth layer of weft yarns in the initial primitive structure, and the jacquard pattern of the preform to be prepared after the adjustment is shown in FIG. 7. In the embodiment of the present application, in FIG. 6 and FIG. 7, for example, when the pixel value of the pixel is the first pixel value, the pixel is black (for convenience of displaying the boundary of the pixel, black dots are used instead of black blocks in FIG. 6 and FIG. 7), and when the pixel value of the pixel is the second pixel value, the pixel is white.

In the embodiment of the present application, the initial jacquard pattern of the preform to be prepared is generated according to the structural information of the preform to be prepared, especially the structural information of the initial primitive structure (the primitive structure without yarn reduction) in the preform to be prepared, and then the initial jacquard pattern is adjusted based on yarn reduction information according to the acquired yarn reduction information such as the actual warp yarn layer number at the interweaving point of each column of warp yarns and each column of weft yarns of the preform to be prepared and the yarn reduction position, the present application can realize integral automatic generation of the jacquard pattern of the preform to be prepared which needs yarn reduction and has a complex structure, without separately acquiring the texture structure at each interweaving point of the preform to be prepared and sequentially generating the jacquard pattern at each interweaving point, so as to combine and form the jacquard pattern of the entire preform to be prepared, and has high generation efficiency of the jacquard pattern. However, because the texture structure of each interweaving point will change to some extent after yarn reduction, it is difficult to obtain the texture structure at each interweaving point, and it is also highly possible to cause errors during the acquisition. Therefore, it is difficult to realize the method for generating the jacquard pattern of the preform without obtaining the texture structure at each interweaving point, and the accuracy of the generated jacquard pattern is high.

Figure 8:
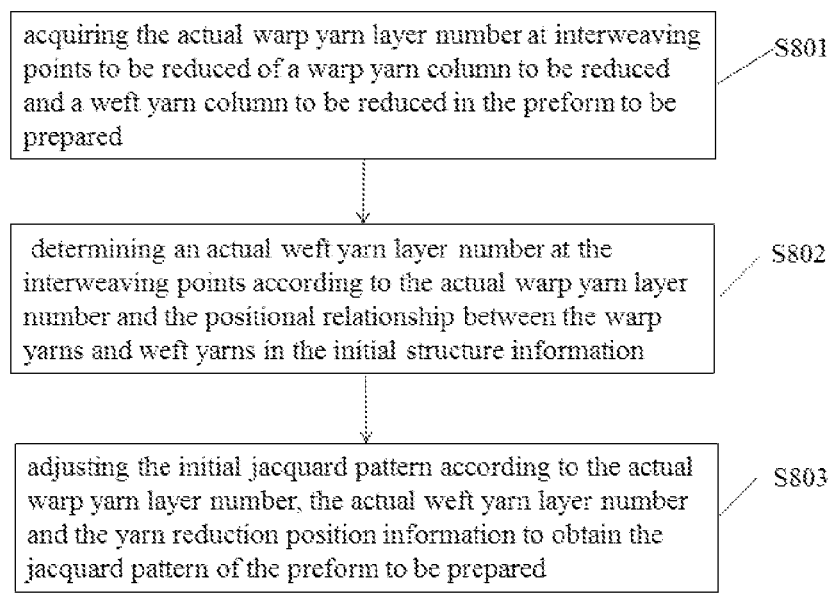
FIG. 8 is a flow chart of specific steps of step S104 in FIG. 1.

As an optional implementation of the embodiment of the present application, as shown in FIG. 8, step S104 may include the following steps:

S801: acquiring the actual warp yarn layer number at interweaving points to be reduced of a warp yarn column to be reduced and a weft yarn column to be reduced in the preform to be prepared.

In the embodiment of the present application, following the above example, if the warp yarn column to be reduced is the seventh column of warp yarns in the preform to be prepared, and the weft yarn column to be reduced is the fifteenth weft yarn column in the preform to be prepared, it can be obtained that the actual warp yarn layer number at the interweaving point to be reduced is 5 according to the yarn reduction information of the preform to be prepared (as shown in Table 2).

S802: determining an actual weft yarn layer number at the interweaving points according to the actual warp yarn layer number and the positional relationship between the warp yarns and weft yarns in the initial structure information.

In the embodiment of the present application, following the above example, according to the positional relationship between warp yarns and weft yarns in the initial structure information of the preform to be prepared, it can be known that the weft layer number at each interweaving point in the preform to be prepared is one more than the warp layer number, so it can be obtained that the actual weft layer number at the interweaving point to be reduced is six.

S803: adjusting the initial jacquard pattern according to the actual warp yarn layer number, the actual weft yarn layer number and the yarn reduction position information to obtain the jacquard pattern of the preform to be prepared.

In the embodiment of the present application, the number of yarn reduction layers in the warp columns to be reduced can be obtained according to the actual warp layer number and the warp layer number in the initial primitive structure, and the specific warp layers to be reduced from the warp yarn layers to be reduced can be obtained according to the number of yarn reduction layers in the warp columns to be reduced and the initial position information for warp yarn reduction in the yarn reduction position information. The number of yarn reduction layers in the weft columns to be reduced can be obtained according to the actual weft yarn layer number and the weft yarn layer number in the initial primitive structure. The specific weft layers to be reduced from the weft yarn layers to be reduced can be obtained according to the number of yarn reduction layers in the weft columns to be reduced and the initial position information for weft yarn reduction in the yarn reduction position information. And the jacquard pattern of the preform to be prepared can be obtained by adjusting the initial jacquard pattern according to the specific warp yarn layers to be reduced from the warp yarn layers to be reduced and the specific weft yarn layers to be reduced from the weft yarn layers to be reduced.

Figures 9, 10:
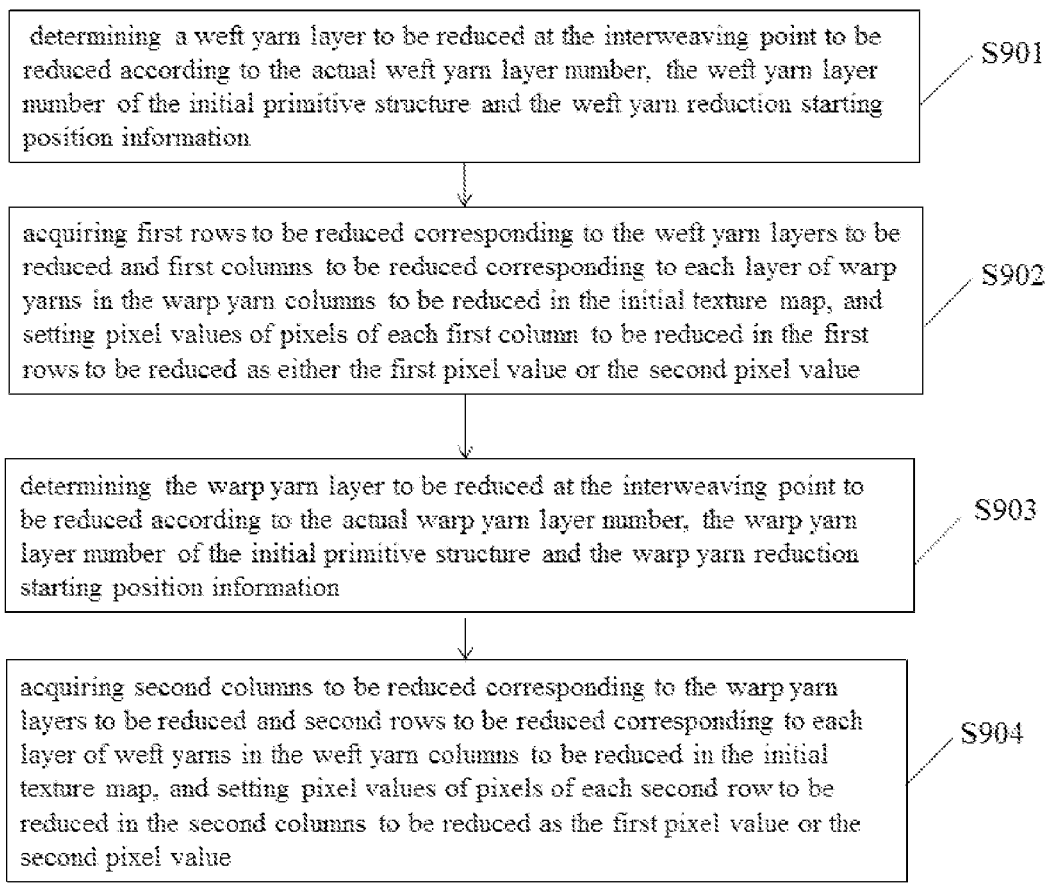
FIG. 9 is a flow chart of specific steps of step S803 in FIG. 8.
FIG. 10 is a jacquard pattern of interweaving points of warp yarns in the seventh column and weft yarns in the fifteenth column of the preform to be prepared in FIGS. 2A-2D.

As an optional implementation of the embodiment of the present application, as shown in FIG. 9, step S803 may include the following steps:

S901: determining a weft yarn layer to be reduced at the interweaving point to be reduced according to the actual weft yarn layer number, the weft yarn layer number of the initial primitive structure and the weft yarn reduction starting position information.

Following the above example, if the warp column to be reduced is the seventh column of warp yarns in the preform to be prepared and the weft column to be reduced is the fifteenth column of weft yarns in the preform to be prepared, then the actual weft layer number is 6 (one more layer than the actual warp layer number 5), while the weft layer number of the initial primitive structure is 10, and the initial position information of weft yarn reduction is the first layer of weft yarns. Therefore, the weft layer to be reduced at the interweaving point is the 1st-4th layers of weft yarns.

S902: acquiring first rows to be reduced corresponding to the weft yarn layers to be reduced and first columns to be reduced corresponding to each layer of warp yarns in the warp yarn columns to be reduced in the initial jacquard pattern, and setting pixel values of pixels of each first column to be reduced in the first rows to be reduced as either the first pixel value or the second pixel value.

Following the above example, the pixel values of the pixels in the first row to the fourth row in the pixels of the seventh column of warp yarns and the fifteenth column of weft yarns in the initial jacquard pattern as the first pixel value or the second pixel value.

In an embodiment of the present application, in order to simplify the finally generated jacquard pattern of the preform to be prepared, the number of rows occupied by the weft columns to be reduced in the jacquard pattern can be set as the maximum value of the actual weft yarn layer number at the interweaving points of the weft yarn columns to be reduced and each warp yarn column to be reduced, and accordingly, in this step, the pixel values of pixels of the rows corresponding to the weft yarn columns to be reduced in the jacquard pattern and having a number greater than the actual weft yarn layer number of the weft yarn columns to be reduced as the first pixel value or the second pixel value.

Following the above example, the maximum value of the actual weft yarn layer number at the interweaving point of the fifteenth column of weft yarn and each warp yarn column to be reduced (J1-J12) is 6, as shown in FIG. 10, the corresponding pixels at the interweaving point to be reduced are in 6 rows in the jacquard pattern. In the embodiment of the present application, when the pixel values of the pixels are also taken as the first pixel value in FIG. 10, the pixels are black (for the convenience of displaying the boundary of the pixels, black dots are used instead of black blocks in FIG. 10), and when the pixel values of the pixels are the second pixel value, the pixels are white.

S903: determining the warp yarn layer to be reduced at the interweaving point to be reduced according to the actual warp yarn layer number, the warp yarn layer number of the initial primitive structure and the warp yarn reduction starting position information.

Following the above example, if the warp column to be reduced is the seventh column of warp yarns in the preform to be prepared and the weft column to be reduced is the fifteenth column of weft yarns in the preform to be prepared, then the actual warp layer number is 5, and the weft layer number in the initial primitive structure is 9, and the warp reduction starting position includes the second layer of warp yarns and the penultimate layer of warp yarns for symmetrical reduction. Therefore, the warp layers to be reduced at the interweaving point are the second layer, the third layer, the seventh layer and the eighth layer of warp yarns.

S904: acquiring second columns to be reduced corresponding to the warp yarn layers to be reduced and second rows to be reduced corresponding to each layer of weft yarns in the weft yarn columns to be reduced in the initial jacquard pattern, and setting pixel values of pixels of each second row to be reduced in the second columns to be reduced as the first pixel value or the second pixel value.

Following the above example, the 2nd and 3rd layers of warp yarns are raised above all weft yarns. Therefore, the pixel values of the 2nd and 3rd columns of pixels in FIG. 10 are the first pixel values (the pixels are black dots), and the pixel values of the seventh and 8th columns of pixels in FIG. 10 are the second pixel values (the pixels are white).

Embodiment 2

Figure 11:
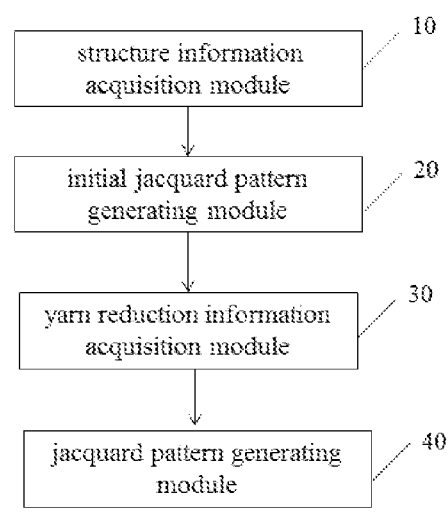
FIG. 11 is a schematic block diagram for generation of the jacquard pattern of a preform provided by an embodiment of the present application.

FIG. 11 shows a remote block diagram of a device for generating a jacquard pattern of a preform according to an embodiment of the present application, which can be used to realize the method for generating a jacquard pattern of a preform according to embodiment 1 or any optional implementation thereof. As shown in FIG. 11, the device includes a structure information acquisition module 10, an initial jacquard pattern generating module 20, a yarn reduction information acquisition module 30 and a jacquard pattern generating module 40.

The structure information acquisition module 10 is used for acquiring initial structure information of a preform to be prepared. In the embodiment of the present application, the initial structure information comprises a warp yarn column number and a weft yarn column number of the preform to be prepared, and a warp yarn column number, a warp yarn layer number, a weft yarn column number and a weft yarn layer number, as well as a positional relationship between the warp yarns and the weft yarns of an initial primitive structure of the preform to be prepared.

The initial jacquard pattern generating module 20 is used for generating an initial jacquard pattern of the preform to be prepared according to the initial structure information. In the embodiment of the present application, pixel values of pixels in the initial jacquard pattern, comprising a first pixel value and a second pixel value, are equal to the first pixel value when warp yarns corresponding to the pixels are located above corresponding weft yarns, and are equal to the second pixel value when warp yarns corresponding to the pixels are located below corresponding weft yarns.

The yarn reduction information acquisition module 30 is used for acquiring yarn reduction information of the preform to be prepared. In the embodiment of the present application, the yarn reduction information comprises an actual warp yarn layer number and yarn reduction position information at interweaving points of each column of warp yarns and each column of weft yarns in the preform to be prepared.

The jacquard pattern generating module 40 is used for adjusting the initial jacquard pattern according to the yarn reduction information to obtain the jacquard pattern of the preform to be prepared.

In the embodiment of the present application, by executing the programs or instructions corresponding to the above modules, it is possible to automatically generate the overall jacquard pattern of the preform to be prepared which needs yarn reduction and has complex structure, and without obtaining the texture structure at each interweaving point, so that it is less difficult to be implemented, and has high accuracy of the generated jacquard pattern.

Embodiment 3

Figure 12:
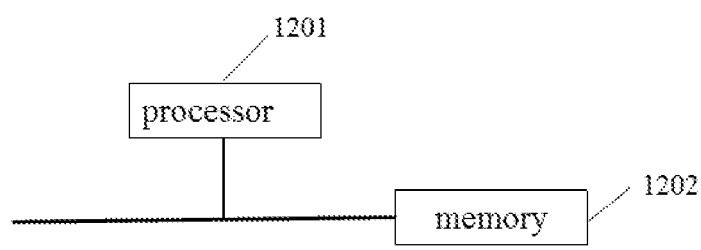
FIG. 12 is a schematic diagram of a hardware structure of an electronic device provided by an embodiment of the present application.

An embodiment of the present application provides an electronic device, as shown in FIG. 12, which may include memory 1201 and a processor 1202, which are connected through a bus or other means, and the connection through a bus is taken as an example in FIG. 12.

The processor 1201 may be a Central-Processing-Unit (CPU). The processor 1201 can also be other general-purpose processors, Digital-Signal-Processor (DSP), Application Specific Integrated Circuit (ASIC), Field-Programmable Gate Array (FPGA), or other programmable logic devices, discrete gate or transistor logic devices, discrete hardware components and other chips, or a combination of the above chips.

As a non-transient computer readable storage medium, the memory 1202 can be used to store non-transient software programs, non-transient computer executable programs and modules, such as program instructions/modules corresponding to the method for generating a jacquard pattern of a preform in embodiment 1 of the present application. The processor 1201 executes various functional applications and data processing of the processor by running non-transient software programs, instructions and modules stored in the memory 1202, that is, realizes the method for generating a jacquard pattern of a preform in the above method embodiments.

The memory 1202 may include a storage program area and a storage data area, wherein the storage program area may store an application program required by an operating system and at least one function. The storage data area may store data created by the processor 1201 and the like. In addition, the memory 1202 may include high-speed random access memory, and may also include non-transient memory, such as at least one disk memory device, flash memory device, or other non-transient solid-state memory devices. In some embodiments, the memory 1202 may optionally include memories remotely located relative to the processor 1201, and these remote memories may be connected to the processor 1201 through a network. Examples of the above networks include, but are not limited to, the Internet, corporate intranet, local area network, mobile communication network and combinations thereof.

The one or more modules are stored in the memory 1202, and when executed by the processor 1201, the method for generating a jacquard pattern of a preform in the embodiment shown in FIGS. 1-9 is executed.

The specific details of the above electronic device can be understood by referring to the corresponding descriptions and effects in the embodiments shown in FIGS. 1 to 9, and will not be repeated here.

It can be understood by those skilled in the art that all or part of the processes in the methods of the above embodiments can be completed by instructing related hardware through a computer program, which can be stored in a computer-readable storage medium, and when the program is executed, it can include the processes of the embodiments of the above methods. The storage medium may be a magnetic disk, an optical disk, or a Read-Only Memory (ROM), Random Access Memory (RAM), Flash Memory, Hard-Disk-Drive (HDD) or Solid-State-Drive (SSD), etc. The storage medium may also include a combination of the above memories.

Obviously, the above-mentioned embodiments are only examples for clear explanation, and are not a limitation of the implementation. For those of ordinary skill in the field, other changes or variations in different forms can be made on the basis of the above description. It is neither necessary nor possible to exhaust all implementations herein. However, the obvious changes or variations derived from this are still within the protection scope of the present application.

The invention claimed is:

1. A method for generating a jacquard pattern of a preform, comprising the following steps:
    acquiring initial structure information of a preform to be prepared, which comprises at least one initial primitive structure; wherein, the initial structure information comprises a warp yarn column number and a weft yarn column number of the preform to be prepared, and a warp yarn column number, a warp yarn layer number, a weft yarn column number and a weft yarn layer number, as well as a positional relationship between the warp yarns and the weft yarns of an initial primitive structure of the preform to be prepared;
    generating an initial jacquard pattern of the preform to be prepared according to the initial structure information; wherein, pixel values of pixels in the initial jacquard pattern, comprising a first pixel value and a second pixel value, are equal to the first pixel value when warp yarns corresponding to the pixels are located above corresponding weft yarns, and are equal to the second pixel value when warp yarns corresponding to the pixels are located below corresponding weft yarns;
    acquiring yarn reduction information of the preform to be prepared; wherein, the yarn reduction information comprises an actual warp yarn layer number and yarn reduction position information at interweaving points of each column of warp yarns and each column of weft yarns in the preform to be prepared; and
    adjusting the initial jacquard pattern according to the yarn reduction information to obtain the jacquard pattern of the preform to be prepared, comprising:
        acquiring the actual warp yarn layer number at interweaving points to be reduced of a warp yarn column to be reduced and a weft yarn column to be reduced in the preform to be prepared;
        determining an actual weft yarn layer number at the interweaving points according to the actual warp yarn layer number and the positional relationship between the warp yarns and weft yarns in the initial structure information; and
        adjusting the initial jacquard pattern according to the actual warp yarn layer number, the actual weft yarn layer number and the yarn reduction position information to obtain the jacquard pattern of the preform to be prepared; wherein the yarn reduction position information comprises information about warp yarn reduction starting position and information about weft yarn reduction starting position, wherein the warp yarn reduction starting position is any layer of warp yarns, and the weft yarn reduction starting position is any layer of weft yarns;
    wherein the step of adjusting the initial jacquard pattern according to the actual warp yarn layer number, the actual weft yarn layer number and the yarn reduction position information to obtain the jacquard pattern of the preform to be prepared comprises:
        determining a weft yarn layer to be reduced at the interweaving point to be reduced according to the actual weft yarn layer number, the weft yarn layer number of the initial primitive structure and the weft yarn reduction starting position information;
        acquiring first rows to be reduced corresponding to the weft yarn layers to be reduced and first columns to be reduced corresponding to each layer of warp yarns in the warp yarn columns to be reduced in the initial jacquard pattern, and setting pixel values of pixels of each first column to be reduced in the first rows to be reduced as either the first pixel value or the second pixel value;
        determining the warp yarn layer to be reduced at the interweaving point to be reduced according to the actual warp yarn layer number, the warp yarn layer number of the initial primitive structure and the warp yarn reduction starting position information; and
        acquiring second columns to be reduced corresponding to the warp yarn layers to be reduced and second rows to be reduced corresponding to each layer of weft yarns in the weft yarn columns to be reduced in the initial jacquard pattern, and setting pixel values of pixels of each second row to be reduced in the second columns to be reduced as the first pixel value or the second pixel value.

2. The method for generating a jacquard pattern of a preform of claim 1, wherein the preform to be prepared comprises at least two initial primitive structures; and the initial structure information also comprises a type of the primitive structure at the interweaving points of each column of warp yarns and each column of weft yarns of the preform to be prepared.

3. The method for generating a jacquard pattern of a preform of claim 1, wherein the number of rows occupied by the weft yarn columns to be reduced in the jacquard pattern is the maximum value of the actual weft yarn layer number at the interweaving points of the weft yarn columns to be reduced and each warp yarn column to be reduced; and the step of adjusting the initial jacquard pattern according to the actual warp yarn layer number, the actual weft yarn layer number and the yarn reduction position information to obtain the jacquard pattern of the preform to be prepared further comprises:
    setting the pixel values of pixels of the rows corresponding to the weft yarn columns to be reduced in the jacquard pattern and having a number greater than the actual weft yarn layer number of the weft yarn columns to be reduced as the first pixel value or the second pixel value.

4. A device for generating a jacquard pattern of a preform, comprising:
    a structure information acquisition module, for acquiring initial structure information of a preform to be prepared; wherein, the initial structure information comprises a warp yarn column number and a weft yarn column number of the preform to be prepared, and a warp yarn column number, a warp yarn layer number, a weft yarn column number and a weft yarn layer number, as well as a positional relationship between the warp yarns and the weft yarns of an initial primitive structure of the preform to be prepared;

an initial jacquard pattern generating module, for generating an initial jacquard pattern of the preform to be prepared according to the initial structure information; wherein, pixel values of pixels in the initial jacquard pattern, comprising a first pixel value and a second pixel value, are equal to the first pixel value when warp yarns corresponding to the pixels are located above corresponding weft yarns, and are equal to the second pixel value when warp yarns corresponding to the pixels are located below corresponding weft yarns;

a yarn reduction information acquisition module, for acquiring yarn reduction information of the preform to be prepared; wherein, the yarn reduction information comprises an actual warp yarn layer number and yarn reduction position information at interweaving points of each column of warp yarns and each column of weft yarns in the preform to be prepared; and a jacquard pattern generating module, for adjusting the initial jacquard pattern according to the yarn reduction information to obtain the jacquard pattern of the preform to be prepared;

wherein the jacquard pattern generating module is configured to adjust the initial jacquard pattern according to the yarn reduction information to obtain the jacquard pattern of the preform to be prepared, by means of:

acquiring the actual warp yarn layer number at interweaving points to be reduced of a warp yarn column to be reduced and a weft yarn column to be reduced in the preform to be prepared;

determining an actual weft yarn layer number at the interweaving points according to the actual warp yarn layer number and the positional relationship between the warp yarns and weft yarns in the initial structure information; and adjusting the initial jacquard pattern according to the actual warp yarn layer number, the actual weft yarn layer number and the yarn reduction position information to obtain the jacquard pattern of the preform to be prepared; wherein the yarn reduction position information comprises information about warp yarn reduction starting position and information about weft yarn reduction starting position, wherein the warp yarn reduction starting position is any layer of warp yarns, and the weft yarn reduction starting position is any layer of weft yarns;

wherein the step of adjusting the initial jacquard pattern according to the actual warp yarn layer number, the actual weft yarn layer number and the yarn reduction position information to obtain the jacquard pattern of the preform to be prepared comprises:

determining a weft yarn layer to be reduced at the interweaving point to be reduced according to the actual weft yarn layer number, the weft yarn layer number of the initial primitive structure and the weft yarn reduction starting position information;

acquiring first rows to be reduced corresponding to the weft yarn layers to be reduced and first columns to be reduced corresponding to each layer of warp yarns in the warp yarn columns to be reduced in the initial jacquard pattern, and setting pixel values of pixels of each first column to be reduced in the first rows to be reduced as either the first pixel value or the second pixel value;

determining the warp yarn layer to be reduced at the interweaving point to be reduced according to the actual warp yarn layer number, the warp yarn layer number of the initial primitive structure and the warp yarn reduction starting position information; and acquiring second columns to be reduced corresponding to the warp yarn layers to be reduced and second rows to be reduced corresponding to each layer of weft yarns in the weft yarn columns to be reduced in the initial jacquard pattern, and setting pixel values of pixels of each second row to be reduced in the second columns to be reduced as the first pixel value or the second pixel value.

5. An electronic device, comprising:

memory and a processor, which are in communication connection with each other, wherein the memory stores computer instructions therein, which are executed by the processor to perform the method for generating a jacquard pattern of a preform according to claim 1.

* * * * *